(12) United States Patent
Bromet et al.

(10) Patent No.: US 7,497,896 B2
(45) Date of Patent: Mar. 3, 2009

(54) METHOD OF TREATING A GAS MIXTURE COMPRISING PROPANE AND PROPYLENE

(75) Inventors: Emmanuelle Bromet, Rueil Malmaison (FR); Guillaume De Souza, Issy les Moulineaux (FR); Olivier Riu, Paris (FR)

(73) Assignee: L'Air Liquide, Societe Anonyme a Directoire et Conseil de Surveillance pour l'Etude et l'Exploitation des Procedes George Claude, Paris (FR)

( * ) Notice: Subject to any disclaimer, the term of this patent is extended or adjusted under 35 U.S.C. 154(b) by 459 days.

(21) Appl. No.: 10/553,545

(22) PCT Filed: Apr. 7, 2004

(86) PCT No.: PCT/FR2004/050150

§ 371 (c)(1),
(2), (4) Date: Oct. 18, 2005

(87) PCT Pub. No.: WO2004/094041

PCT Pub. Date: Nov. 4, 2004

(65) Prior Publication Data

US 2006/0266213 A1    Nov. 30, 2006

(30) Foreign Application Priority Data

Apr. 18, 2003    (FR) .................................. 03 04865

(51) Int. Cl.
*B01D 53/22*    (2006.01)

(52) U.S. Cl. .......................... 95/50; 95/55; 95/56; 96/7; 96/9; 96/12; 96/13; 96/14; 585/802; 585/809; 585/819; 526/68; 526/72; 526/77

(58) Field of Classification Search .................... 95/45, 95/50, 55, 56; 96/4, 7, 9, 12, 13, 14; 210/640, 210/650, 651; 526/68, 72, 77; 585/802, 585/809, 818

See application file for complete search history.

(56) References Cited

U.S. PATENT DOCUMENTS

| | | | | |
|---|---|---|---|---|
| 3,758,603 A | * | 9/1973 | Steigelmann et al. | .......... 95/44 |
| 4,235,983 A | * | 11/1980 | Steigelmann et al. | .......... 95/50 |
| 4,623,704 A | * | 11/1986 | Dembicki et al. | ............. 526/68 |
| 4,750,918 A | | 6/1988 | Sirkar | |

(Continued)

FOREIGN PATENT DOCUMENTS

EP    0 582 184    2/1994

(Continued)

OTHER PUBLICATIONS

International Search Report for PCT/FR2004/050150, 2004.

*Primary Examiner*—Jason M Greene
(74) *Attorney, Agent, or Firm*—Donna Blalock Holguin

(57) ABSTRACT

Methods for treating a gas mixture of at least propylene and propane, in order to separate the propylene from the propane. The gas mixture is brought into contact with a membrane enables the selective permeation of the propylene with respect to the propane. A propylene-enriched permeate and a propane-enriched retentate is formed. The propylene concentration of the permeate in the membrane is then reduced with a sweeping gas.

15 Claims, 1 Drawing Sheet

U.S. PATENT DOCUMENTS

| | | | | |
|---|---|---|---|---|
| 5,507,856 A | * | 4/1996 | Rao et al. | 95/50 |
| 5,611,842 A | * | 3/1997 | Friesen et al. | 95/50 |
| 5,670,051 A | * | 9/1997 | Pinnau et al. | 95/50 |
| 5,753,008 A | * | 5/1998 | Friesen et al. | 95/45 |
| 5,769,927 A | * | 6/1998 | Gottschlich et al. | 95/50 |
| 6,271,319 B1 | * | 8/2001 | Baker et al. | 526/68 |
| 6,361,582 B1 | | 3/2002 | Pinnau et al. | |
| 6,559,348 B1 | * | 5/2003 | Aittamaa et al. | 95/50 |
| 6,963,018 B2 | * | 11/2005 | Vasileiadis et al. | 585/654 |
| 7,361,800 B2 | * | 4/2008 | Herrera et al. | 95/50 |

FOREIGN PATENT DOCUMENTS

| | | |
|---|---|---|
| EP | 0 701 856 | 3/1996 |
| EP | 0 753 337 | 1/1997 |

* cited by examiner

METHOD OF TREATING A GAS MIXTURE COMPRISING PROPANE AND PROPYLENE

BACKGROUND

The present invention relates to a method for separating propane and propylene contained in a gas mixture.

The propylene polymerization reaction for obtaining polypropylene generally uses:
- propylene, as monomer,
- a catalyst (Ziegler-Natta, metallocene, chromium oxide, etc.),
- an agent controlling the length of the polymer chains, such as hydrogen, and
- inert substances issuing or not from the reaction (propane, nitrogen, etc.).

During this polymerization reaction, unreacted propylene is usually recycled to the inlet of the polymerization reactor. This recycling involves a step of cooling or condensation of the effluent from the polymerization reactor, in order to maintain a constant reaction temperature. The propylene is recycled with other components of the reactor effluent such as hydrogen, propane and nitrogen. The propane recycling is supplemented by a make-up of very rich and very pure propylene. Although this make-up is very rich in propylene, inert substances, such as propane and nitrogen, or light compounds, such as hydrogen, accumulate in the recycling effluent, thereby considerably reducing the productivity of the polymerization unit. To decrease the concentration of these inert substances or these light compounds, the recycling loop is occasionally purged of these substances. In other words, a part of the recycling loop is sent to a monomer recovery unit or flared. This purge operation has the drawback of decreasing the profitability of the polymerization process because either an additional unit is dedicated to propylene recovery, or the propylene is lost at the flare. To decrease these losses, it was proposed in patent U.S. Pat. No. B1-6,271,319 to treat the recycled effluent with a membrane permitting the selective permeation of the propylene with respect to the propane. Thus, the membrane serves to obtain 1) a propane-enriched retentate which can thus be removed from the recycle loop and 2) a propylene-enriched permeate which can be recycled to the polymerization reactor. The propylene losses are therefore limited in comparison with the prior art and the productivity of the polymerization process is improved. The drawback of this solution is that the membranes described in U.S. Pat. No. B1-6,271,319 consist of materials selected from polyimides, polyphenylene oxides and perfluoropolymers, which are slightly permeable to propylene. In consequence, for a given installed membrane surface area, the propylene recovery rate remains low.

SUMMARY

The invention includes methods to achieve the desired results, as described, but is not limited to the various embodiments disclosed.

The object of the present invention is to propose a method for improving the propylene/propane separation by permeation particularly in propylene polymerization units.

A further object is to propose a method for improving the propylene/propane separation by permeation in the propylene polymerization units in order to increase the productivity of polypropylene production.

For this purpose, the invention relates to a method for treating a gas mixture comprising at least propylene and propane in order to separate the propylene from the propane, in which the gas mixture is contacted with a membrane (M1) carrying out the selective permeation of propylene with respect to propane so as to obtain a propylene-enriched permeate and a propane-enriched retentate, characterized in that the propylene concentration of the permeate in the membrane is decreased by means of a sweeping gas.

The invention further relates to a polypropylene polymerization method, comprising the following steps:
a) polymerization of propylene,
b) recovery of an effluent issuing from step a) and comprising at least polypropylene, propane and propylene,
c) treatment of the effluent from step b) in order to produce a solid effluent comprising at least polypropylene and a gaseous effluent comprising at least propane and propylene,
d) treatment of the gaseous effluent issuing from step b) or originating from the propylene recovery section, in order to separate the propylene from the propane, in which the gaseous mixture is contacted with a membrane (M1) carrying out the selective permeation of propylene with respect to propane in order to obtain a propylene-enriched permeate and a propane-enriched retentate, characterized in that the propylene concentration of the permeate in the membrane is decreased by means of a sweeping gas,
e) recycling of the propylene-enriched permeate issuing from the membrane (M1) to a polymerization step.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
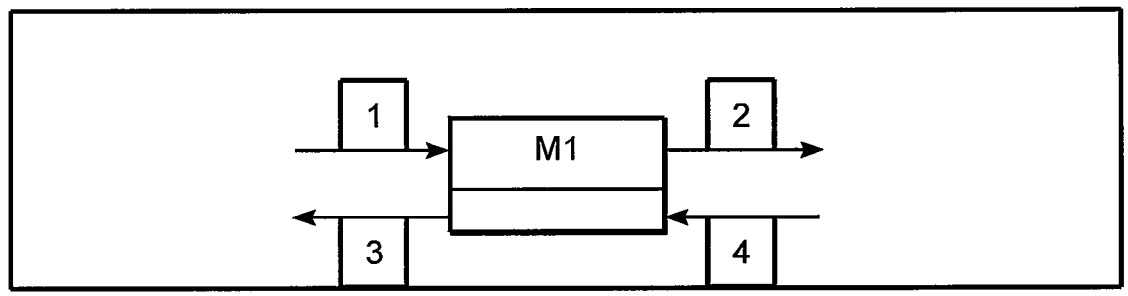
FIG. 1 illustrates a schematic view of one embodiment of a method according to the present invention.

The invention includes a procedure for the propylene/propane separation by permeation, as described above.

Hence the invention relates first to a method for treating a gas mixture comprising at least propylene and propane in order to separate the propylene from the propane, in which the gas mixture is contacted with a membrane (M1) carrying out the selective permeation of propylene with respect to propane in order to obtain a propylene-enriched permeate and a propane-enriched retentate, characterized in that the propylene concentration of the permeate in the membrane is decreased by means of a sweeping gas. The method according to the invention relates to the treatment of a gas mixture comprising at least propylene and propane. The proportions of these two compounds in the mixture may be variable and are generally between 5% by weight and 25% by weight for propane and 75% by weight and 95% by weight for propylene. This gas mixture may comprise other compounds such as hydrogen, nitrogen, in proportions in the range of 10% and 15% by weight respectively. This gas mixture issuing from the polymerization reaction or from the propylene recovery unit normally has a pressure of between 10 bar and 45 bar. The separation of the propylene and the propane from the gas mixture is obtained by a permeation method, that is, contacting of the gas mixture with a membrane (M1) carrying out the selective permeation of propylene with respect to propane. To ensure this selectivity between the two compounds, the membrane (M1) preferably consists of a material selected from polyimides and perfluoropolymers. The propylene preferably passes through the membrane and is recovered on the low pressure side forming the propylene-enriched permeate, that is, which has a higher propylene concentration than the gas mixture to be treated. The propane preferably remains on the high pressure side of the membrane and forms the propane-enriched retentate, that is, which has a higher propane concentration than the gas mixture to be treated. According to the essential characteristic of the invention, the propylene concentration of the permeate in the membrane is decreased by contacting a sweeping gas with the low pressure side of the membrane (permeate side). The sweeping gas is normally introduced in countercurrent flow to the feed of gas mixture to be treated. The sweeping gas serves to increase the propylene partial pressure gradient on either side of the membrane and accordingly improves the productivity of the membrane. The sweeping gas does not contain any propylene and is preferably ethylene.

The method according to the invention can be implemented in particular during a polypropylene polymerization process; in this case, the sweeping gas is advantageously a gas comprising ethylene (with a purity, for example, higher than 99% by weight), particularly if ethylene is used as comonomer during one of the polypropylene copolymerization reactions. This particular implementation serves to improve the propylene/propane separation efficiency while ensuring the pre-mixing of the monomer, the propylene and the comonomer, upstream of the polymerization reactor.

According to a particular embodiment of the method according to the invention, when the gas mixture to be treated also comprises hydrogen, before the step of contacting the gas mixture with the membrane (M1) carrying out the selective permeation of propylene with respect to propane, the gas mixture may be contacted with a membrane (M2) carrying out the selective permeation of hydrogen with respect to propane and to propylene in order to obtain a hydrogen-enriched permeate and a retentate enriched with propylene and propane. This particular embodiment is recommended when the gas mixture to be treated comprises hydrogen in a non-negligible quantity, for example a hydrogen concentration above 2% by weight. The membrane (M2) carrying out the selective permeation of the hydrogen normally consists of a material selected from polyamides or polyimides. Preferably, the membrane (M2) is in the form of hollow fibers grouped in bundles forming a permeation module. According to a preferred application of this particular embodiment, the hydrogen concentration on the permeate side in the membrane (M2) carrying out the selective permeation of hydrogen is decreased by means of a sweeping gas. The hydrogen concentration of the permeate in the membrane (M2) is decreased by contacting the sweeping gas, preferably nitrogen or any other effluent containing no hydrogen, with the low pressure side of the membrane (M2) (permeate side). The sweeping gas is normally introduced in countercurrent flow to the feed of the gas mixture to be treated. The sweeping gas serves to increase the hydrogen partial pressure gradient on either side of the membrane (M2) and accordingly improves the productivity of the membrane. This particular embodiment (combination of two membranes M1 and M2) serves to remove both the propane and the hydrogen from the gas mixture, while minimizing the hydrogen losses.

The invention further relates to a propylene polymerization method, comprising the following steps:

a) polymerization of propylene,
b) recovery of an effluent issuing from step a) and comprising at least polypropylene, propane and propylene,
c) treatment of the effluent from step b) in order to produce a solid effluent comprising at least polypropylene and a gaseous effluent comprising at least propane and propylene,
d) treatment of the gaseous effluent issuing from step b), or originating from the propylene recovery unit, in order to separate the propylene from the propane, in which the gaseous mixture (1) is contacted with a membrane (M1) carrying out the selective permeation of propylene with respect to propane in order to obtain a propylene-enriched permeate (2) and a propane-enriched retentate (3), characterized in that the propylene concentration of the permeate in the membrane is diluted by means of a sweeping gas,
e) introduction in the polymerization step a) of the propylene-enriched permeate (3) issuing from the membrane (M1) carrying out the selective permeation of propylene with respect to propane.

According to this polymerization method, the polymerization reactor effluent is generally treated during a step b) of cooling or condensation. The gas phase comprises at least propylene and propane, and is then treated by the treatment method previously defined and possibly by its preferred and particular embodiments.

Thus:
the membrane (M1) may consist of a material selected from polyimides and perfluoropolymers.
the sweeping gas (4) may be a gas comprising ethylene or any other effluent containing no propylene,
the gaseous effluent (1) issuing from step c) or issuing from the propylene recovery unit may further comprise hydrogen and, during the step of contacting the gaseous effluent (1) with the membrane (M1) carrying out the selective permeation of propylene with respect to propane, the gaseous effluent (1) may be contacted with a membrane (M2) carrying out the selective permeation of hydrogen with respect to propane and propylene, in order to obtain a hydrogen-enriched permeate (5) and a retentate (6) enriched with propylene and propane,
the membrane (M2) carrying out the selective permeation of hydrogen may consist of a material selected from polyamides or polyimides,
the hydrogen concentration of the permeate in the membrane (M2) carrying out the selective permeation of hydrogen may be decreased by means of a sweeping gas (7),
the sweeping gas (7) used during the selective permeation of hydrogen may be a gas comprising nitrogen, or any other effluent containing no hydrogen.

According to a particular embodiment, the step a) may be a polypropylene copolymerization step. In this case, the sweeping gas (4) is advantageously a gas comprising ethylene.

According to a further particular embodiment of the invention, the effluent (1) issuing from step c) may be mixed with a gaseous effluent (1') issuing from the successive sequence of a step a') of polypropylene copolymerization, followed by a step b') of recovering the effluent issuing from step a') and comprising at least polypropylene, propane and propylene, followed by a step c') of treatment of the effluent from step b') so as to produce a solid effluent comprising at least polypropylene and the gaseous effluent (1') comprising at least propane and propylene. This embodiment is adapted to the case of a propylene copolymerization process. Thus, the membrane (M1) may treat a mixture of at least two gaseous effluents (1) and (1') issuing, on the one hand, from the propylene homopolymerization section, and on the other hand, from a propylene copolymerization section. The permeate (3) issuing from the membrane may then be recycled to the propylene copolymerization step.

The propane separated from the propylene is generally removed from the process and sent to the fuel gas network of the process or to the flare.

The propylene recovered on the permeate side of the membrane M1 is generally recompressed via existing compressors or via a new compressor before its introduction into the copolymerization section.

Figure 2:
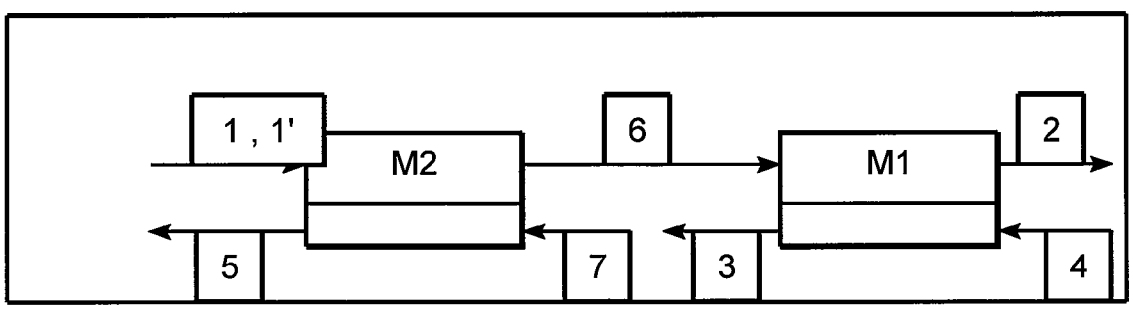
FIG. 2 illustrates a schematic view of a second embodiment of a method according to the present invention.

FIGS. 1 and 2 show the putting into practice of the method according to the invention and more particularly the functioning of the membranes. FIG. 1 shows the functioning of the membrane (M1) carrying out the selective permeation of propylene with respect to propane. The gas mixture (1) comprising at least propylene and propane, and possibly hydrogen and/or nitrogen, is introduced on the higher pressure side of the membrane (M1). A sweeping gas (4) having a lower pressure than the gas mixture (1) is introduced in countercurrent flow to the gas mixture (1) and on the permeate side of the membrane. The following compounds issue from the membrane:

- on the one hand, from the higher pressure side, the retentate (2) enriched with propane compared with the gas mixture (1),
- on the other hand, on the lower pressure side, the permeate (3) enriched with propylene compared with the gas mixture (1).

FIG. 2 shows the functioning of the membranes (M1) and (M2) carrying out the permeation of propane and hydrogen from the gas mixture comprising propylene, propane and hydrogen. The gas mixture (1) and/or (1') comprising at least propylene, hydrogen and propane is introduced on the higher pressure side of the membrane (M2). A sweeping gas (7) having a lower pressure than the gas mixture (1) is introduced in countercurrent flow to the gas mixture (1) and on the permeate side of the membrane. The following compounds issue from the membrane (M2):

- on the one hand, from the higher pressure side, the retentate (6) enriched with propane and propylene compared with the gas mixture (1),
- on the other hand, from the lower pressure side, the permeate (3) enriched with hydrogen compared with the gas mixture (1).

The retentate (6) of the membrane (M2) is then contacted with the membrane (M1) and in particular, is introduced on the higher pressure side of the membrane (M1). A sweeping gas (4) having a lower pressure than the retentate (6) is introduced in countercurrent flow to the retentate (6) of the membrane (M2) and on the permeate side of the membrane (M1). The following compounds issue from the membrane (M1):

- on the one hand, from the higher pressure side, the retentate (2) enriched with propane compared with the gas mixture (1) and with the retentate (6) of the membrane (M2),
- on the other hand, from the lower pressure side, the permeate (3) enriched with propylene compared with the gas mixture (1) and with the retentate (6) of the membrane (M2).

It has been demonstrated that the removal of propane enhances catalyst activity and serves to increase the productivity of the propylene production units. Thus, it has been possible to increase the productivity of a Ziegler-Natta type catalyst by 0.5 to 2%, corresponding to additional quantities of polypropylene resin produced (about 2500 tonnes of resin for a polypropylene unit with a capacity of 250 ktonnes/yr) while reducing the propylene losses.

The putting into practice of the method according to the invention also has the advantage of permitting the control of the propylene recovery rate by controlling the flow rate of sweeping gas, contrary to the membrane methods of the prior art, in which the recovery rate depended on the membrane surface area installed for a given permeate pressure.

The sweeping gas also serves to solve problems of membrane ageing (longer service life).

The particular embodiment of the method according to the invention has the advantage of improving the propylene/propane separation efficiency by permeation while permitting separation of the hydrogen.

The use of an ethylene-rich sweeping gas or a propylene comonomer serves to improve the propylene/propane separation efficiency while ensuring the premixing of the monomer (propylene) and ethylene or of the monomer (propylene) and the comonomer upstream of the copolymerization reactor.

EXAMPLES

With a polyimide membrane module having a membrane surface area of 470 $m^2$, putting into practice the method according to the invention, it was possible to recover 84% of the propylene present in the gas mixture comprising 76 mol % of propylene and 24 mol % of propane. The sweeping gas used comprised 100% ethylene. The details of the characteristics of the application are given in Table 1 below.

TABLE 1

| Propylene/propane separation by membrane with sweeping gas (ethylene) | | | | |
|---|---|---|---|---|
| | Gas introduced into the membrane | Sweeping gas | Permeate | Residue |
| Composition (mol %) | | | | |
| hydrogen | 0 | 0 | 0 | 0 |
| ethylene | 0 | 100 | 56.4 | 0.6 |
| propylene | 76 | 0 | 40.2 | 39 |
| propane | 24 | 0 | 3.4 | 60.4 |
| Partial molar flow (Nm³/h) | | | | |
| hydrogen | 0 | 0 | 0 | 0 |
| ethylene | 0 | 133 | 133.03 | 0.25 |
| propylene | 112.48 | 0 | 94.85 | 17.55 |
| propane | 35.52 | 0 | 8.12 | 27.19 |
| Molecular weight (g/mol) | 42.6 | 28 | 34.2 | 43.2 |
| Throughput (kg/h) | 281.1 | 166.2 | 360.3 | 86.8 |
| Throughput (Nm³/h) | 148 | 133 | 236 | 45 |
| P(bar abs) | 19 | 19 | 3.8 | 19 |
| T (° C.) | 148 | 148 | 90 | 90 |

By comparison, the permeation method carried out with the same membrane but without sweeping gas, according to the prior art technique, only served to recover 71 mol % of the propylene present in the same gas mixture, as shown in Table 2 below.

TABLE 2

Propylene/propane separation by membrane without sweeping gas

| | Gas introduced into the membrane | Sweeping gas | Permeate | Residue |
|---|---|---|---|---|
| Composition (mol %) | | | | |
| hydrogen | 0 | 0 | 0 | 0 |
| ethylene | 0 | 100 | 56.4 | 0.6 |
| propylene | 76 | 0 | 40.2 | 39 |
| propane | 24 | 0 | 3.4 | 60.4 |
| Partial molar flow (Nm³/h) | | | | |
| hydrogen | 0 | 0 | 0 | 0 |
| ethylene | 0 | 133 | 133.03 | 0.25 |
| propylene | 112.48 | 0 | 94.85 | 17.55 |
| propane | 35.52 | 0 | 8.12 | 27.19 |
| Molecular weight (g/mol) | 42.6 | 28 | 34.2 | 43.2 |
| Throughput (kg/h) | 281.1 | 166.2 | 360.3 | 86.8 |
| Throughput (Nm³/h) | 148 | 133 | 236 | 45 |
| P(bar abs) | 19 | 19 | 3.8 | 19 |
| T (° C.) | 148 | 148 | 90 | 90 |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used to separate propylene from propane from within a gas mixture during the polymerization of polypropylene, said method comprising:
    a) contacting a gas mixture with a first membrane, wherein said gas mixture comprises propylene and propane;
    b) obtaining both a propylene-enriched permeate and a propane-enriched retentate through the selective permeation, by said first membrane, of propylene with respect to propane; and
    c) decreasing the propylene concentration of said permeate in said first membrane with a first sweeping gas that comprises ethylene.

2. The method of claim 1, wherein said membrane comprises at least one material selected from the group consisting of:
    a) polyimides;
    b) polyphenylene oxides; and
    c) polymers.

3. A method which may be used to separate propylene from propane from within a gas mixture, said method comprising:
    a) contacting a gas mixture comprising propylene, propane and hydrogen with a second membrane and obtaining a permeate enriched with hydrogen and a retentate enriched with propylene and propane, by a selective permeation with said second membrane;
    b) contacting the retentate enriched with propylene and propane with a first membrane and obtaining both a propylene-enriched permeate and a propane-enriched retentate through the selective permeation by said first membrane, of propylene with respect to propane; and
    c) decreasing the propylene concentration of said propylene-enriched permeate in said first membrane with a first sweeping gas.

4. The method of claim 3, wherein said second membrane comprises at least one material selected from the group consisting of polyamides and polyimides.

5. The method of claim 3, further comprising decreasing the hydrogen concentration of said permeate enriched with hydrogen in said second membrane with a second sweeping gas.

6. The method of claim 5, wherein said second sweeping gas comprises nitrogen.

7. A method which may be used for the polymerization of polypropylene, said method comprising:
    a) performing a polymerization of propylene;
    b) recovering an effluent from said polymerization, wherein said effluent comprises:
        1) polypropylene;
        2) propane; and
        3) propylene;
    c) treating said effluent to produce a solid effluent and a gaseous effluent, wherein:
        1) said solid effluent comprises polypropylene; and
        2) said gaseous effluent comprises propane and propylene;
    d) treating at least part of said gaseous effluent to separate said propylene from said propane, wherein said treating said gaseous effluent comprises:
        1) contacting at least part of said gaseous effluent with a first membrane;
        2) obtaining both a propylene-enriched permeate and a propane-enriched retentate, through a selective permeation of propylene with respect to propane, wherein said permeation is carried out by said first membrane; and
        3) introducing a first sweeping gas to decrease the propylene concentration of said permeate in said first membrane; and
    e) introducing said propylene-enriched permeate to said polymerization of propylene.

8. The method of claim 7, wherein said first membrane comprises at least one material selected from the group consisting of:
    a) polymides;
    b) polyphenylene oxides; and
    c) perfluoropolymers.

9. A method which may be used for the polymerization of polypropylene, said method comprising:
    a) performing a polymerization of propylene;
    b) recovering an effluent from said polymerization, wherein said effluent comprises:
        1) polypropylene;
        2) propane; and
        3) propylene;
    c) treating said effluent to produce a solid effluent and a gaseous effluent, wherein:
        1) said solid effluent comprises polypropylene; and
        2) said gaseous effluent comprises propane, propylene and hydrogen;
    d) subjecting said gaseous effluent to a pretreatment, said pretreatment comprising:
        1) contacting said gaseous effluent with a second membrane; and
        2) obtaining a permeate enriched with hydrogen and a retentate enriched with propylene and propane, by a selective permeation with said second membrane;

e) treating at least part of said retentate enriched with propylene and propane to separate said propylene from said propane, wherein said treating of said retentate enriched with propylene and propane comprises:
   1) contacting at least part of said retentate with propylene and propane with a first membrane;
   2) obtaining both a propylene-enriched permeate and a propane-enriched retentate, through a selective permeation of propylene with respect to propane, wherein said permeation is carried out by said first membrane; and
   3) introducing a first sweeping gas to decrease the propylene concentration of said permeate in said first membrane; and
f) introducing said propylene-enriched permeate to said polymerization of propylene.

10. The method of claim 9, wherein said second membrane comprises at least one material selected from the group consisting of polyamides and polyimides.

11. The method of claim 9, further comprising decreasing the hydrogen concentration of said hydrogen enriched permeate in said second membrane with a second sweeping gas.

12. The method of claim 11, wherein said second sweeping gas comprises nitrogen.

13. The method of claim 7, wherein said polymerization of polypropylene comprises a copolymerization of polypropylene.

14. The method of claim 13, wherein said first sweeping gas comprises ethylene.

15. The method of claim 7, further comprising mixing said effluent with a second gaseous effluent, wherein said second gaseous effluent is produced by:
   a) performing a copolymerization of polypropylene followed by a recovery of a second effluent, wherein said second effluent comprises polypropylene, propane, and propylene; and
   b) treating said second effluent to produce a second solid effluent and said second gaseous effluent, wherein:
      1) said second solid effluent comprises polypropylene; and
      2) said second gaseous effluent comprises propane and propylene.

* * * * *